US011902655B2

(12) United States Patent
Casey et al.

(10) Patent No.: US 11,902,655 B2
(45) Date of Patent: *Feb. 13, 2024

(54) INFRARED AND VISIBLE IMAGING SYSTEM FOR MONITORING EQUIPMENT

(71) Applicant: X Development LLC, Mountain View, CA (US)

(72) Inventors: Leo Francis Casey, San Francisco, CA (US); Peter Light, San Francisco, CA (US); Joel Fraser Atwater, Danville, CA (US); Crystal Elayna Winston, Charlotte, NC (US); Mehrdad Roosta, Campbell, CA (US); Siyuan Xin, Mountain View, CA (US); Chetan Mahadeswaraswamy, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,588

(22) Filed: Jan. 30, 2023

(65) Prior Publication Data

US 2023/0239568 A1 Jul. 27, 2023

Related U.S. Application Data

(63) Continuation of application No. 17/220,469, filed on Apr. 1, 2021, now Pat. No. 11,595,561, which is a
(Continued)

(51) Int. Cl.
*H04N 23/661* (2023.01)
*G06T 7/70* (2017.01)
(Continued)

(52) U.S. Cl.
CPC ........... *H04N 23/661* (2023.01); *B60R 11/04* (2013.01); *G01C 19/56* (2013.01); *G01J 5/025* (2013.01);
(Continued)

(58) Field of Classification Search
CPC ........ H04N 23/661; H04N 5/33; H04N 7/181; B60R 11/04; G01C 19/56; G01J 5/025;
(Continued)

(56) References Cited

U.S. PATENT DOCUMENTS 5,166,789 A 11/1992 Myrick
6,833,822 B2 12/2004 Klocek et al.
(Continued)

FOREIGN PATENT DOCUMENTS

CN 207200874 4/2018
CN 108258613 7/2018
(Continued)

OTHER PUBLICATIONS

Christensen et al., "The Thermal Emission Imaging System (THEMIS) for the Mars 2001 Odyssey Mission," Space Science Review, Jan. 2004, 110(1-2):46 pages.
(Continued)

*Primary Examiner* — Gevell V Selby
(74) *Attorney, Agent, or Firm* — Fish & Richardson P.C.

(57) ABSTRACT

Methods, systems, and apparatus for an infrared and visible imaging system. In some implementations, Image data from a visible-light camera is obtained. A position of a device is determined based at least in part on the image data from the visible-light camera. An infrared camera is positioned so that the device is in a field of view of the infrared camera, with the field of view of the infrared camera being narrower than the field of view of the visible-light camera. Infrared image data from the infrared camera that includes regions
(Continued)

representing the device is obtained. Infrared image data from the infrared camera that represents the device is recorded. Position data is also recorded that indicates the location and pose of the infrared camera when the infrared image data is acquired by the infrared camera.

20 Claims, 4 Drawing Sheets

Related U.S. Application Data continuation of application No. 16/287,010, filed on Feb. 27, 2019, now Pat. No. 10,972,649.

(51) Int. Cl.
*B60R 11/04* (2006.01)
*G01C 19/56* (2012.01)
*G01J 5/02* (2022.01)
*G01S 19/13* (2010.01)
*H04N 5/33* (2023.01)
*H04N 7/18* (2006.01)
*G01J 5/07* (2022.01)
*G01J 5/00* (2022.01)

(52) U.S. Cl.
CPC .............. *G01J 5/07* (2022.01); *G01S 19/13* (2013.01); *G06T 7/70* (2017.01); *H04N 5/33* (2013.01); *H04N 7/181* (2013.01); *G01J 2005/0077* (2013.01)

(58) Field of Classification Search
CPC ..... G01J 5/07; G01J 2005/0077; G01S 19/13; G06T 7/70
See application file for complete search history.

(56) References Cited

U.S. PATENT DOCUMENTS

| | | | |
|---|---|---|---|
| 6,972,787 | B1 | 12/2005 | Allen et al. |
| 7,208,733 | B2 | 4/2007 | Mian et al. |
| 7,535,002 | B2 | 5/2009 | Johnson et al. |
| 7,538,326 | B2 | 5/2009 | Johnson et al. |
| 9,143,670 | B1 | 9/2015 | Cilia |
| 11,595,561 | B2 * | 2/2023 | Casey .............. H04N 5/33 |
| 2002/0180759 | A1 | 12/2002 | Park |
| 2005/0128291 | A1 * | 6/2005 | Murakami .......... H04N 7/181 348/169 |
| 2005/0253928 | A1 * | 11/2005 | McKeown .......... G06V 10/143 348/E5.09 |
| 2015/0035962 | A1 | 2/2015 | Nagaoka |
| 2019/0236386 | A1 * | 8/2019 | Yu ..................... H04N 5/33 |
| 2020/0275011 | A1 | 8/2020 | Casey et al. |
| 2021/0227125 | A1 | 7/2021 | Casey et al. |

FOREIGN PATENT DOCUMENTS

| | | |
|---|---|---|
| EP | 2902319 | 8/2015 |
| KR | 100869998 | 11/2008 |

OTHER PUBLICATIONS

Colantonio et al., "Object tracking in a stereo and infrared vision system," Infrared Physics & Technology, Jan. 2007, 49(3):6 pages.
Dimla, "Sensor signals for tool-wear monitoring in metal cutting operations—a review of methods," International Journal of Machine Tools and Manufacture, Jun. 2000, 40(8):26 pages.
Goubet et al., "Pedestrian tracking using thermal infrared imaging," Proceedings of Defense and Security Symposium, May 18, 2006, 14 pages.
International Preliminary Report on Patentability in International Appln. No. PCT/US2020/020021, dated Sep. 10, 2021, 12 pages.
Larrauri et al., "Automatic system for overhead power line inspection using an Unmanned Aerial Vehicle RELIFO Project," IEEE, International Conference on Unmanned Aircraft Systems, 2013, pp. 244-252.
Matikainen et al., "Remote sensing methods for power line corridor surveys," ISPRS Journal of Photogrammetry and Remote Sensing, 2016, 119:10-31.
Nguyen et al., "Automatic autonomous vision-based power line inspection: A review of current status and the potential role of deep learning." International Journal of Electrical Power & Energy Systems, 2018, 99:107-120.
PCT International Search Report and Written Opinion in International Appln. No. PCT/US2020/020021, dated Jul. 31, 2020, 20 pages.
PCT Invitation to Pay Fees in International Appln. No. PCT/US2020/020021, dated May 25, 2020, 6 pages.
Talha et al., "Particle Filter Tracking of Camouflaged Targets by Adaptive Fusion of Thermal and Visible Spectra Camera Data," IEEE Sensors Journal, Jan. 2014, 14(1):8 pages.
Yang et al., "Design of a 3-D Infrared Imaging System Using Structured Light," IEEE Transaction in Instrumentation and Measurement, Feb. 2011, 60(2):10 pages.

* cited by examiner

INFRARED AND VISIBLE IMAGING SYSTEM FOR MONITORING EQUIPMENT

CROSS-REFERENCE TO RELATED APPLICATIONS

This application is a continuation of U.S. application Ser. No. 17/220,469, filed Apr. 1, 2021, which is a continuation of U.S. application Ser. No. 16/287,010, filed Feb. 27, 2019, the contents of which are incorporated by reference herein.

BACKGROUND

It can be beneficial to monitor some types of equipment, such as electrical utility equipment, to detect wear and allow preventative maintenance. Some systems exhibit stress or wear through elevated temperatures, which may be detectable using infrared cameras.

SUMMARY

In some implementations, an infrared (IR) camera and a visible-light camera ("visible camera") are used together in an imaging system. The imaging system can be used for scanning utility assets such as electrical power equipment. The imaging system can be mounted on a vehicle and can monitor nearby equipment while the vehicle is driving. The imaging system can access mapping data in order to estimate the location of a device to be monitored. The imaging system can position the visible camera to aim towards the device's estimated location and identify the device using data from the visible camera. With position information determined from the visible camera's image data, the imaging system positions the IR camera so that the device to be monitored is in the IR camera's field of view. Once the IR camera is appropriately positioned, the imaging system can obtain an IR image of the device.

In some implementations, after the imaging system obtains an IR image of the device, the imaging system transmits the data to a server system for further processing. The IR image can be analyzed to determine a temperature of the device. For example, a normalized temperature can be calculated by taking into account, for example, calibration data of the IR camera, weather data for the area in which the device is located, and load data indicating electrical load on the device at the time when the IR image was captured. The IR image can also be analyzed to determine if there are any hotspots on the device (e.g., unusual temperature distributions) or other anomalies. In some instances, the normalized temperature of the device is also used to detect anomalies.

The results of processing IR image data can be used to better assess and maintain devices. Further analysis can detect conditions that trigger any of various actions. For example, after a normalized temperature of the device is calculated, the temperature may be compared to a threshold. Similarly, trend data for the device can be compared to typical or expected trends for the device type. Based on the comparison results, the server system may take one or more actions. If the comparison results in an unfavorable trend or if thresholds are exceeded, the server system may issue a notification or alert. As another example, the server system may schedule an earlier time for the device to be retested. The server system may also estimate the wear on the device using temperature analysis and trend analysis. The server system may also store the results of analysis, including the most recent normalized temperature, for use in future evaluation of the device.

In one aspect a system includes a visible-light camera having a first field of view; an infrared camera having a second field of view, where the second field of view is narrower than the first field of view; one or more sensors to determine location and pose of the infrared camera; a positioning system configured to adjust the position of the infrared camera; and a processing system. The processing system is configured to identify a position of a device based at least in part on image data generated by the visible-light camera that represents the device; cause the positioning system to position the infrared camera so that the device is in the second field of view; and record (i) infrared image data from the infrared camera that represents the device and (ii) position data, based on output of the one or more sensors, that indicates the location and pose of the infrared camera when the infrared image data is acquired.

In some implementations, the positioning system is further configured to adjust the position of the visible-light camera.

In some implementations, the visible-light camera, the infrared camera, the one or more sensors, and the positioning system are mounted to a vehicle; and the positioning system is further configured to keep the device in the infrared camera's field of view as the vehicle is moving.

In some implementations, the processing system is further configured to obtain location data on the device to get an estimated location of the device; cause the positioning system to position the visible-light camera so that the estimated location of the device is within the visible-light camera's field of view; and record visible-light image data from the visible-light camera.

In some implementations, the positioning system is further configured to adjust the position of the infrared camera separately from the position of the visible-light cam era.

In some implementations, the processing system is configured to use automated object recognition to identify the device.

In some implementations, the one or more sensors include an accelerometer and a global positioning system (GPS) receiver.

In some implementations, the device is associated with an identifier; and recording infrared image data comprises recording an association of the infrared image data and the identifier for the device.

In some implementations, the infrared camera's field of view is in a range of 6-24 degrees diagonal; and the visible-light camera's field of view is in a range of 120-180 degrees diagonal.

In one aspect a method includes obtaining image data from a visible-light camera, the image data having a portion that represents a device in a field of view of the visible-light camera; identifying a position of a device based at least in part on the image data from the visible-light camera; positioning an infrared camera so that the device is in a field of view of the infrared camera, the field of view of the infrared camera being narrower than the field of view of the visible-light camera; obtaining infrared image data from the infrared camera that includes regions representing the device; and recording (i) infrared image data from the infrared camera that represents the device and (ii) position data, based on output of one or more sensors coupled to the infrared camera, that indicates the location and pose of the infrared camera when the infrared image data is acquired by the infrared camera.

In some implementations, the method further includes determining an identifier for the device. Where recording image data from the infrared camera includes associating the recorded data with the identifier for the device.

In some implementations, the method further includes normalizing the infrared image data to obtain a normalized temperature of the device. Where normalizing the infrared image data includes receiving temperature factor data comprising at least ambient data of the device; calculating the normalized temperature of the device based on the received temperature factor data; and recording the normalized temperature of the device and associating the normalized temperature data with the identifier for the device.

In some implementations, the temperature factor data further includes load data of the device.

In some implementations, the ambient data is infrared image data of one or more additional devices neighboring the device.

In some implementations, the method further includes determining wear of the device based on the normalized temperature of the device.

In some implementations, the method further includes comparing the normalized temperature of the device to one or more predetermined temperature thresholds; determining if the normalized temperature of the device exceeds the one or more predetermined temperature thresholds; and performing an action if it is determined that the normalized temperature of the device exceeds the one or more thresholds.

In some implementations, performing the action includes at least one of: providing an alert notification; updating a future scheduled measurement of the device to an earlier point in time; or scheduling a replacement of the device.

In some implementations, the method further includes looking up data associated with the identifier for the device, including dates when prior temperature measurements of the device were taken and prior normalized temperatures of the device at those dates; evaluating the prior normalized temperatures of the device and the normalized temperature of the device over time to obtain a pattern of the device; comparing the pattern of the device to a predetermined pattern; determining if the pattern of the device deviates from the predetermined pattern by more than a predetermined pattern threshold; and performing an action if it is determined that the pattern of the device deviates from the predetermined pattern by more than the predetermined pattern threshold.

In some implementations, the method further includes obtaining location data and a travel direction of a vehicle from one or more sensors coupled to the vehicle, where the visible-light camera and the infrared camera are mounted to the vehicle; accessing map data indicating locations of devices to be monitored; using the map data, selecting one of the devices to be monitored based on the location data and the travel direction of the vehicle; and positioning the visible-light camera toward an anticipated location of the selected device that is determined using the map data.

In some implementations, obtaining the image data from the visible-light camera and obtaining the image data from the infrared camera are performed while the visible-light camera and the infrared camera are coupled to moving vehicle; and the visible-light camera and the infrared camera are stabilized by a positioning system that uses one or more sensors and one or more motors or actuators to compensate for movement of the vehicle.

Implementations of the techniques in the application can provide various advantages and improvements over previous systems. For example, the use of cameras that detect visible light and infrared light can provide higher quality monitoring. Using a visible light camera to identify the position of a device and guide the positioning of the infrared light camera allows accurate placement of the infrared light camera and acquisition of higher quality data. This technique, along with stabilization systems such as gyroscopes, helps maintain proper alignment of the infrared camera when the camera system is moving, such as when mounted to a vehicle in motion.

High quality monitoring is also enabled by aligning the image data from the visible light camera with map data, which can be done by aligning GPS data or other position data with the map data and/or aligning visible landmarks in captured image data with previously captured image data. This alignment can allow for robust and versatile monitoring. For example, the system can start with information about the locations of certain devices to be monitored and then through image capture and analysis add information about or compensate for changing conditions, such as tree growth, new buildings, new bus stops, whether the device is in the sun or in shade, etc. Changing conditions near a device may not be identifiable from infrared image data alone and may decrease the accuracy of monitoring if not taken into account. Nevertheless, the present system can detect and adjust for these types of conditions using the capture of visible image data for a relatively wide area showing the surroundings of the device, which is enhanced as image data is captured from multiple perspectives due to movement of the system on a vehicle.

In some implementations, the capture and processing of both visible camera image data and infrared camera data can further enhance maintenance analysis. For example, the visible camera data can provide the system the ability to identify (e.g., using automatic object recognition) and monitor devices in varying conditions, such as shade, sun, being partially obscured, and so on, in which may be challenging for an infrared camera alone to detect a device much less determine the device's status. The use of the visible camera also facilitates the identification and tracking of devices as the system moves on a vehicle, which allows for faster data gathering and more frequent monitoring of devices. In some implementations, the visible camera image data can be used to place devices in context and to determine three-dimensional relationships (e.g., attitude, angle, distances, etc.) with respect to monitored devices and nearby landmarks and/or the camera system.

The versatility of the system can allow it to identify, map out, and check condition of many types of assets. This can include monitoring the locations and conditions of wires, which can be followed and tracked along different paths. Although some devices, such as wires between locations, may not be specifically mapped or identified in data from a utility or on a map, the system can discover and identify them using the visible camera image data, and update mapping data as well as monitor their condition with both visible-light image data and infrared image data.

The ability to monitor and maintain devices can also be improved by accounting for usage levels, load levels, environmental factors such as weather, etc. when processing data from the infrared camera. Data sources indicating load levels, weather, and so on can be integrated into the maintenance determination process to normalize temperature data and lead to a more accurate determination of a device's condition and maintenance needs.

The details of one or more embodiments are set forth in the accompanying drawings and the description, below.

Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
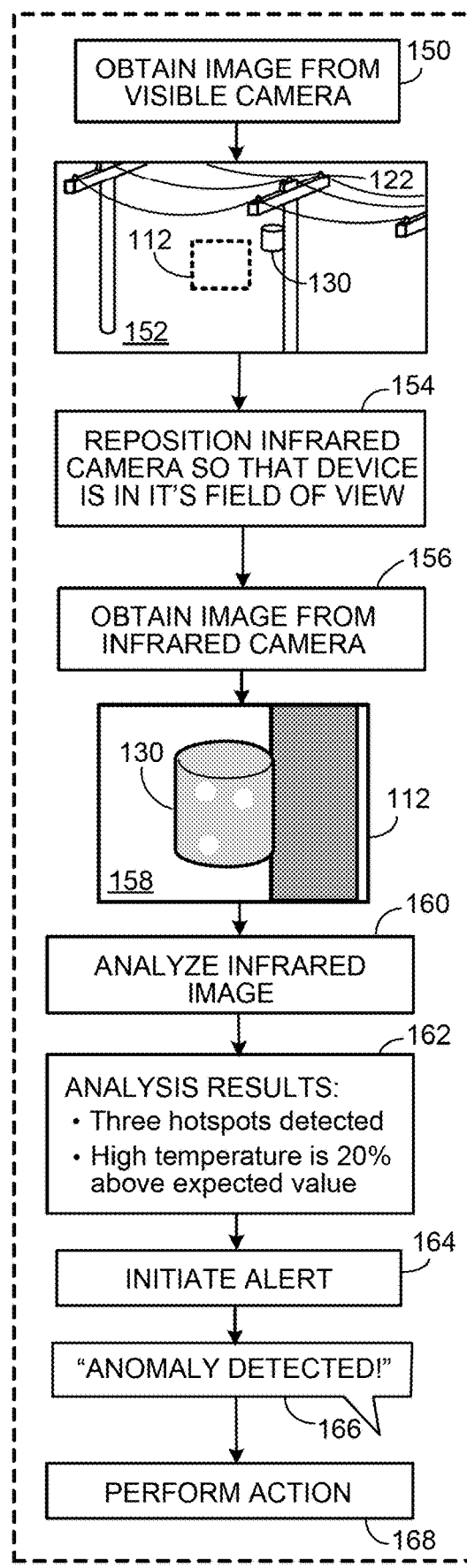
FIG. 1 is a diagram that illustrates an example of an infrared and visible imaging system.
Figure 1:
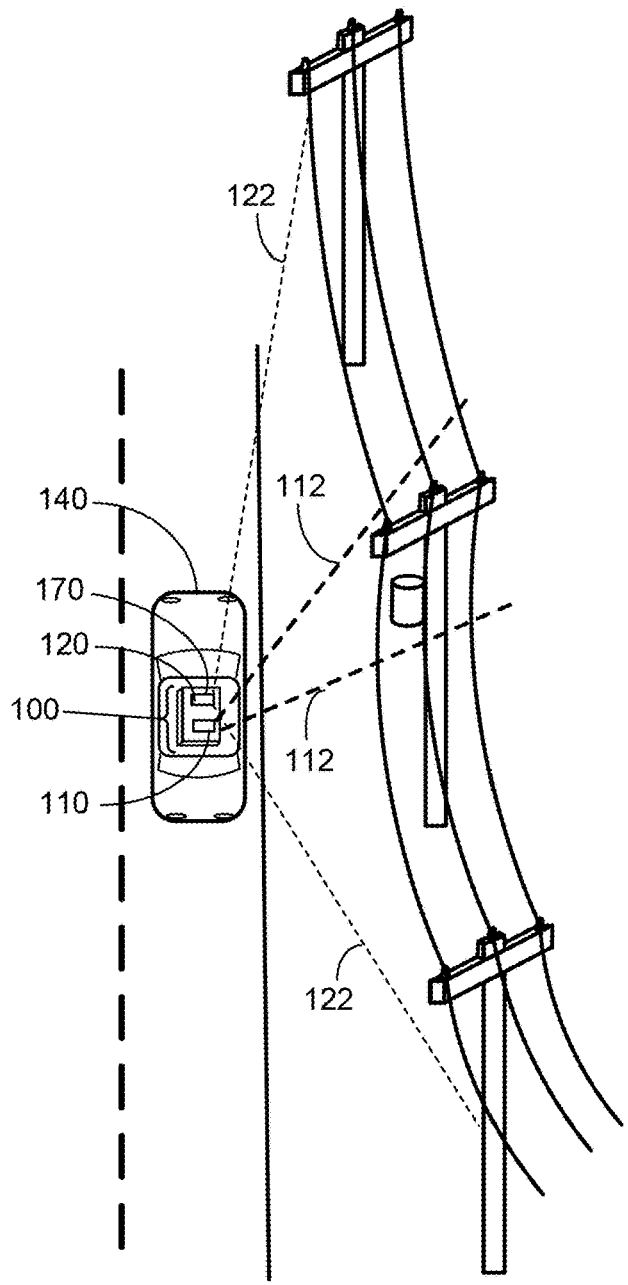

FIG. 1 is a diagram that illustrates an example infrared and visible imaging system 100. The system 110 can be used to capture images of utility assets such as power equipment and wires. The infrared and visible imaging system 100 includes a visible camera 120 (e.g., a camera that detects visible light), an IR camera 110 (e.g., a camera that detects primarily infrared light), and a mount 170 to which the visible camera 120 and the IR camera 110 are both coupled. The mount 170 can include a gimbal, e.g., a pivoted support mechanism allowing movement about one or more axes, that can be used to position the cameras 110, 120 as discussed below. The visible camera 120 operates in the visible range of light and has a first field of view 122 defined by the dashed lines. The IR camera 110 operates in the infrared range of light and has a second field of view defined by the dashed lines 112. As shown, the first field of view 122 of the visible camera is wider than the second field of view 112 of the IR camera 110.

The imaging system 100 can be mounted on a vehicle 140. In some implementations, the vehicle 140 is an autonomous vehicle. As shown, when the vehicle 140 is traveling down a roadway, the visible camera 120 and the IR camera 110 are aimed towards utility equipment 130 (e.g., a distribution transformer), such that utility equipment 130 falls into the respective fields of view of each of the cameras. As shown, the imaging system 100 is imaging at an upwards angle (e.g., the IR camera 110 and the visible camera 120 are aimed upwards) to capture images of pole-mounted utility equipment such as utility equipment 130. By imaging at an upwards angle, imaging system 100 has the benefit of avoiding many basic privacy concerns. In some implementations, imaging system 100 also captures images at horizontal and downward angles in order to obtain images of non-pole-mounted equipment such as cable TV distribution boxes on walls of building, wall-mounted transformers, ground-mounted transformers, etc.

Utility equipment can include transformers (e.g., pole-mounted distribution transformers, wall-mounted transformers, ground/pad-mounted transformers, etc.), insulator bushings (e.g., insulator bushing without dielectric fluid, insulator bushing with dielectric fluid, etc.), capacitors (e.g., auto-switched pole-mounted capacitors, fixed pole-mounted capacitors, series pole-mounted capacitors, residential secondary capacitors, house capacitors, stack-rack capacitors, etc.), pole-mounted fuses, other switchgear (e.g., circuit breakers, fuses, etc.), voltage regulators (e.g., pole-mounted voltage regulator, etc.), reclosers, pole crossarms, distribution boxes, etc. Imaging system 100 can capture images of other devices in addition to utility equipment, such as, for example, utility wires. Utility wires can include the wires that are within, connected to, and/or surrounding utility equipment. Utility wires may also include conductors (e.g., transmission conductors, multi-grounded neutral conductors, primary distribution conductors, secondary distribution conductors, etc.).

As shown in FIG. 1, the imaging system 100 obtains an image from the visible camera 120 (step 150). The visible-light image 152 shows the field of view 122 of the visible camera 120. Within image 152, a smaller field of view 112 of the IR camera 110 is shown with dashed lines, in the area that the IR camera 110 is initially positioned to capture data. At the initial position, the utility equipment 130 is currently outside of the IR camera 110's field of view 112.

In order to position utility equipment 130 within the IR camera 110's field of view 112, the imaging system 100 detects the utility equipment 130 in the image 152. The imaging system 100 may also access data indicating a location of the utility equipment 130, such as GPS coordinates, map data, or other location data, and determines the position of the utility equipment 130 with respect to the current position of the imaging system 100. The imaging system 100 then repositions the IR camera 110 (e.g., based on the image data 152 and location data) so that utility equipment 130 falls within the IR camera 110's field of view 112 (step 154).

The imaging system 100 then obtains an image from the IR camera 110 (step 156). The illustrated infrared image 158 shows the field of view 112 of the IR camera 110, which is smaller than and is contained within the field of view 122 of the visible camera 120. Once the infrared image 158 containing utility equipment 130 is obtained, the infrared image 158 is analyzed (step 160). Example results 162 show that three hotspots were detected in utility equipment 130 and that the temperature of these hotspots reached 20% above the expected temperature of the utility asset 130 (see FIG. 3, 310).

Based on the analysis in step 160, the system 100 may perform various actions. For example, the system 100 can record the measurements and take action to address maintenance needs. In the example, the detection of the hotspots triggers the initiation of an alert (step 164). An example alert 166 provides a message, "Anomaly Detected!" that may, for example, be provided to one or more users for output in visual or audible form. Of course, alerts and other notifications can include additional information such as an identification of the specific equipment 130 affected, the type of issue identified, a level of urgency, recommended corrective actions, predicted consequences of correction or inaction, and so on.

The system 100 can also perform any of various actions in addition to or instead of sending an alert 166 (step 168). The action performed may be, for example, scheduling of a new infrared image capture (e.g., scheduling of a new measurement), modification or removal of a scheduled measurement, scheduling the replacement of a device (here, utility equipment 130), modification or removal of a scheduled device replacement, and/or recording or updating information about the device (e.g., its location, its position such as height above the ground or angle or elevation from the road, the type of utility asset, its measured temperature, its normalized temperature, the date at which a measurement is taken, the identification number of the utility asset). In some implementations, the action performed is the creation of a notification or alert from the system. The action of the system be performed automatically, e.g., without user action or initiation, based on the analysis of the infrared image and the previous measurements of the device being monitored (here, utility equipment 130).

The disclosed system and related techniques provide a quick and efficient means of capturing thermal information about utility assets. By mounting the imaging system 100 onto a vehicle 140, which can be an autonomous vehicle, the imaging system 100 is mobile and is able to quickly obtain images of many utility assets over a wide geographic area, especially when using a fleet of vehicles, each having their own system 100. This is important because most utility assets are spread across wide geographies. Also, most utility assets are adjacent to, and visible from roadways, making an imaging system mounted to a vehicle, such as system 100, ideal for efficiently capturing images of most utility assets.

The disclosed system and related techniques provide a solution to the problem of accurately aiming an IR camera, such as IR camera 110, which has a narrow field of view. Due to the narrow field of view 112 of the IR camera 110, the IR camera 110 needs to be precisely positioned in order to get a utility asset to fall within its field of view 112. This problem is exacerbated by the imaging system 100 being mounted on a vehicle 140 and trying to capture images while the vehicle 140 is in motion. The disclosed system solves this problem by incorporating a visible camera 120 which has a wider field of view 122. By positioning the visible camera 120 generally toward a utility asset, the utility asset will fall within the visible camera 120's wide field of view 122. Once the utility asset is within the field of view 122, the imaging system 100 will identify the asset and then accurately aim the IR camera 110 so that the utility asset is within the IR camera 110's field of view 112. Therefore, by utilizing the IR camera 110 in combination with the visible camera 120, the imaging system 100 is able to accurately aim the IR camera towards the subject utility asset.

Capturing thermal information of utility assets, as imaging system 100 does, is important in order to identify and track the state-of-health of those assets. This identification and tracking can make preventative maintenance more efficient and effective (e.g., reducing the time and man-hours needed to identify failing equipment), save utility companies costs (e.g., damage to PCBs from having a transformer blow), improve customer satisfaction by lowering the number of power outages due to equipment failure, and allow utility companies to better plan ahead (e.g., by making them aware of equipment that is starting to fail, by giving them a more accurate lifespan of equipment). The captured thermal information can then be used in determining whether any anomalies are present and the state-of-health of an asset, e.g., the wear on or the estimated remaining lifespan of the asset, and/or the failure of an asset.

Detecting anomalies and determining and tracking the state-of-health of an asset over time can be useful for preventative maintenance and, thus, can help to prevent power outages or other system failures. The determined state-of-health of a particular utility asset can provide a more accurate indication of its remaining lifespan when compared to other estimations (e.g., based on the asset's age). Thus, determining a state-of-health of a particular utility can save costs by (i) indicating to the utility companies which of their assets they should replace and/or need to replace, (ii) allowing the utility companies to more efficiently budget their spending, and (iii) indicating which utility assets not to replace if they are still sufficiently healthy despite their age. Similarly, determining the state-of-health of an asset and tracking its health over time can help identify the likely cause of a power outage or other system failure should one occur.

Figure 2:
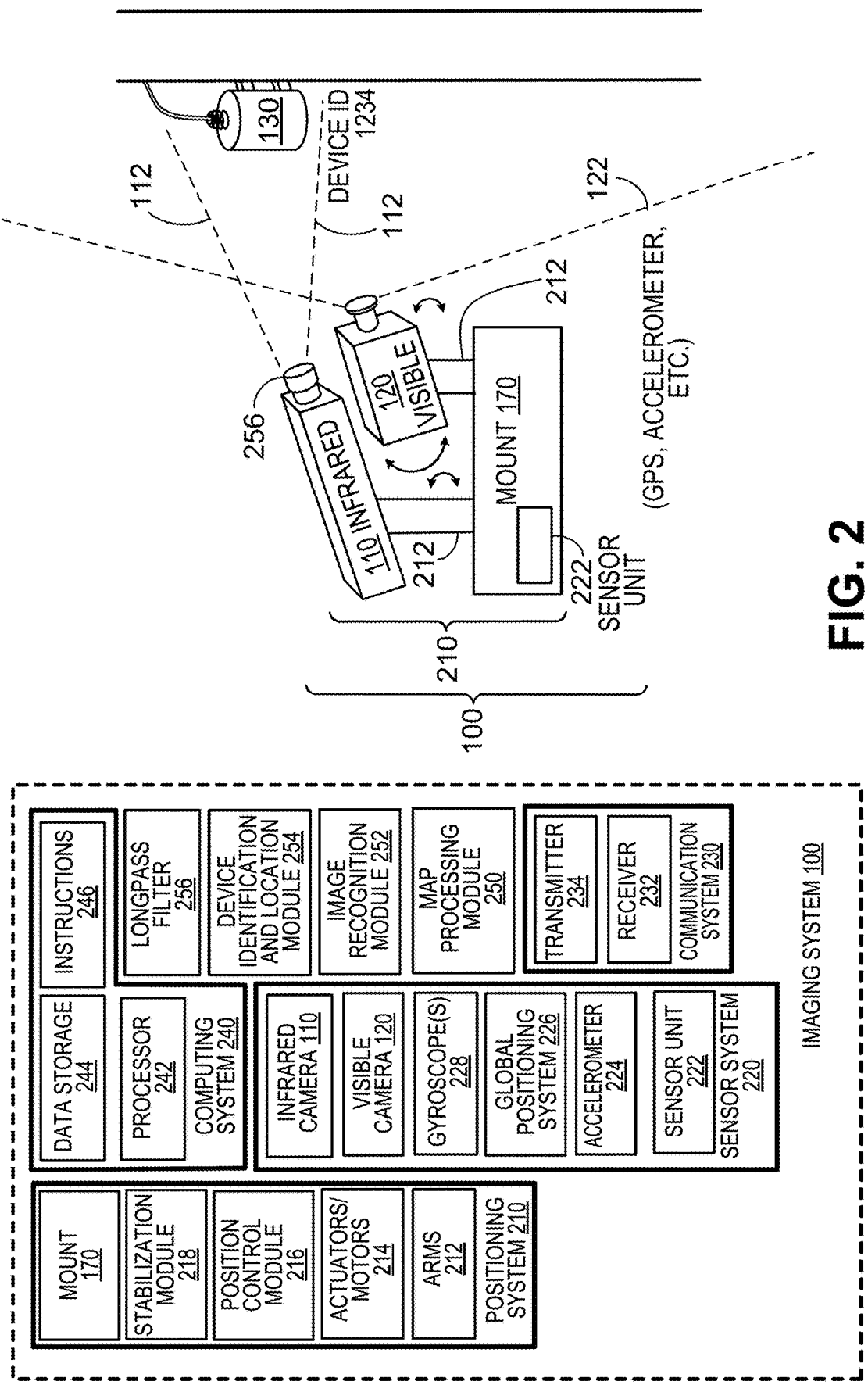
FIG. 2 is a diagram that illustrates additional aspects of the infrared and visible imaging system.

FIG. 2 is a diagram that illustrates additional aspects of the infrared and visible imaging system. The diagram includes is a simplified block diagram of the imaging system 100. As shown, the imaging system 100 includes a positioning system 210, a sensor system 220, a communication system 230, a computing system 240, a map processing module 250, an image recognition module 252, a device identification and location module 254, and a longpass filter 256.

The positioning system 210 includes, for example, the mount 170, actuators/motors 214, and a stabilization module 216. The positioning system 210 in combination with gyroscope(s) 228 (as shown in FIG. 2) is able to stabilize the IR camera 110 and the visible camera 120 to compensate for bumps, shaking, vibration, and movement of the vehicle 140. In some implementations, the positioning system 210 can also include a vibration isolator to provide further stabilization. The vibration isolator may be positioned between the vehicle 140 and the mount 170, or, alternatively, between the mount 170 and the armatures 212 (as shown in FIG. 2). By stabilizing the IR camera 110 and visible camera 120, the imaging system 100 is able to capture accurate images of the utility assets without requiring the vehicle 140 to stop. This allows the imaging system 100 to capture images of more utility assets in a shorter time frame and still obtain precise images. The positioning system 210 can also dynamically adjust the positions of the cameras 110, 120 as the vehicle 140 moves, to maintain a device in the field of view to acquire image captures of longer durations and to capture images from different perspectives.

The positioning system 210 is configured to position the IR camera 110 and the visible camera 120 such that a device falls within their respective fields of view. The positioning system 210 includes the mount 170, arms 212, actuators/motors 214, position control module 216, and stabilization module 218. In some implementations, the positioning system also includes a vibration isolator such as a wire mount to further stabilize the IR camera 110 and the visible camera 120. The vibration isolator may be positioned between the vehicle 140 (as shown in FIG. 1) and the mount 170, or, alternatively, between the mount 170 and the arms 212. In some implementations, the mount 170 is a vibration isolator such as a wire mount.

The mount 170 is configured to secure the imaging system 100 to a vehicle 140 (as shown in FIG. 1) and to provide a platform for the IR camera 110 and the visible camera 120. The mount 170 is coupled to the arms 212 which hold the IR camera 110 and the visible camera 120. The mount 170 is further configured to house a sensor unit 222. In some implementations, the mount 170 houses two or more actuators/motors of actuators/motors 214 that can be used to rotate arms 212 with respect to the mount 170.

The arms 212 are configured to hold the IR camera 110 and the visible camera 120, and couple both cameras to the mount 170. The arms 212 are further configured to rotate with respect to the mount 170. Each of the arms 212 can rotate independently from one another so that the horizontal angle of the IR camera 110 can be different than the horizontal angle of the visible camera 120. In some implementations, the arms 212 house two or more of the actuators/motors 214 at their lower ends to facilitate rotation with respect to the mount 170. In other implementations, arms 212 are rotors of or, alternatively, are secured to rotors of electrical motors (that would be part of actuators/motors 214) housed in the mount 170.

The IR camera 110 and the visible camera 120 are pivotally affixed to the arms 212 at their upper ends. By allowing the cameras 110 and 120 to pivot, the vertical angle of the cameras 110 and 120 is modified. The IR camera can pivot on a first arm of arms 212 independently from the visible camera 120, which can pivot on a second arm of arms 212. Pivoting of the cameras 110 and 120 is controlled through motors/actuators 214. In some implementations, two or more actuators of motors/actuators 214 are used to pivot (e.g., change the vertical angle of) the cameras 110 and 120. In such implementations, one or more actuators are secured between the first arm of arms 212 and the IR camera 110, and one or more other actuators are secured between the second arm of arms 212 and the visible camera 120. In other implementations, two or more motors of motors/actuators 214 are used to pivot (e.g., change the vertical angle of) the cameras 110 and 120. In such implementations, one or more motors are secured to a first pivot axis where the IR camera 110 is affixed to the first arm of arms 212, and one or more other motors are secured to a second pivot axis where the visible camera 120 is affixed to the second arm of arms 212.

The actuators/motors 214 are configured to position the IR camera 110 and the visible camera 120 by independently adjusting their horizontal and vertical angles. Various arrangements of where the actuators/motors 214 are positioned is discussed above. Actuators/motors 214 may include direct current (DC) electrical motors, alternating current (AC) electrical motors, rotary actuators (e.g., servomotor), other electrical actuators, pneumatic actuators, hydraulic actuators, etc. Actuators/motors 214 are further configured to receive the output of the position control module 216 as an input. In some implementations, actuators/motors 214 are further configured to receive output of the stabilization module 218 as an input. In some implementations, one or more actuators/motors of actuators/motors 214 are further configured to stabilize the IR camera 110 and/or visible camera 120. In these implementations, stabilization may be carried out by these actuators/motors in conjunctions with one or more gyroscopes of gyroscope(s) 228.

The position control module 216 is configured to receive the output of the image recognition module 252 as an input, and receive the output of one or more of the sensor unit 222 sensors (e.g., accelerometer(s) 224, global positioning system (GPS) 226, and gyroscope(s) 228) as an input. In some implementations, the position control module 216 is further configured to receive the output of the map processing module as an input. Based on these inputs, the position control module 216 is further configured to determine a new position (e.g., a horizontal and vertical angle) or a change in position of the IR camera 110 and/or the visible camera 120, and is configured to output instructions to the actuators/motors 214 so that they may move the cameras to the determined new position or in accordance with the determined change in position.

The map processing module 250 can determine where devices (e.g., utility equipment 130) are located with respect to the vehicle 140 (as shown in FIG. 1). Based on this information, the system determines what devices, if any, are upcoming along the path of the vehicle 140, and, for those upcoming devices, additional information can be obtained (e.g., height of a device or angle of elevation for the camera to view the device). Position information can be output to the position control module 216, which can then output instructions to the actuators/motors 214 to adjust the position of the visible camera 120. In some implementations, the position control module 216 also takes into account the speed, acceleration, and orientation of the vehicle 140 (as shown in FIG. 1) when providing instruction to the actuators/motors 214.

Figure 3:
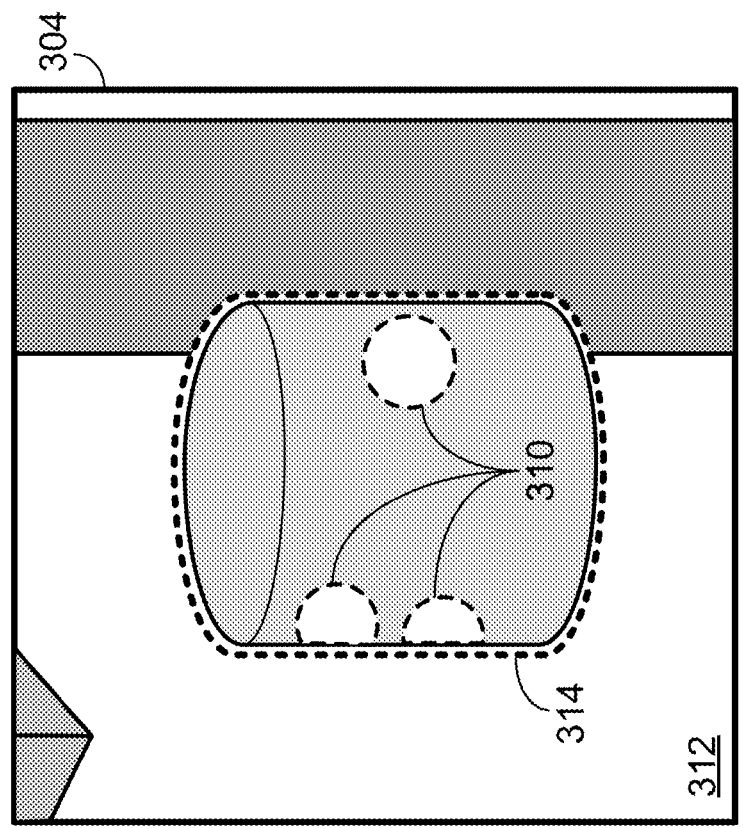
FIG. 3 is a diagram that illustrates examples of representations of image data captured by a visible-light camera and an infrared camera.
Figure 3:
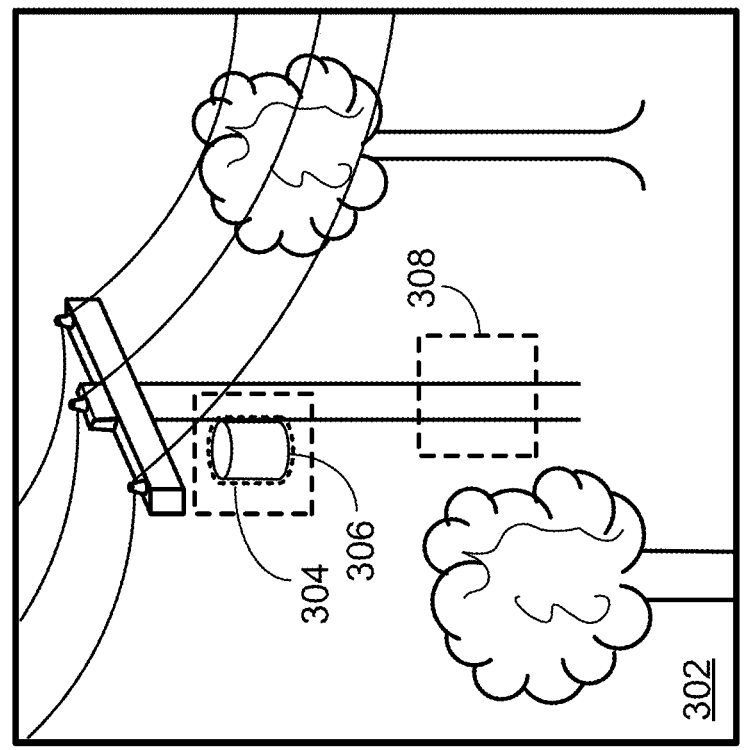

In some implementations, position control module 216 also sends additional instructions to the actuators/motors 214 to adjust the horizontal and vertical angle of the IR camera 110 to match the position of the visible camera 120, such that, for example, IR camera 110's field of view 112 is initially centered in visible camera 120's field of view 122 (see initial field of view 308 in FIG. 3). This could decrease the amount of adjustment later needed to the IR camera 110's position and, thus, the time to adjust the IR camera 110's position. This would have the benefit of increasing the efficiency of imaging system 100 by allowing the vehicle 140 (as shown in FIG. 1) to travel at a greater speed during imaging.

In some implementations, the instructions to the actuators/motors 214 adjust the position of the visible camera 120 so that device falls within the field of view 122 of the visible camera 122. These instructions may be continuously or periodically updated and output to the actuators/motors 214 as the vehicle 140 (as shown in FIG. 1) approaches the device, or, alternatively, are only provided once when the vehicle 140 is sufficiently close to the device. In other implementations, the instructions to the actuators/motors 214 adjust the position of the visible camera 120 so that it is generally aimed in a direction such that the device will fall within the visible camera 120's field of view 122 when the vehicle 140 (as shown in FIG. 1) is sufficiently close to the device.

Once the visible camera 120 is positioned with the device (e.g., utility equipment 130) in its field of view 122, an instruction is sent to the visible camera 120 to capture a visible-light image and to the GPS 226 to obtain position and time data. The obtained position and time data from GPS 226 indicate when and where the visible-light image was taken. In some implementations, instructions are also sent to the accelerometer(s) 224 and the gyroscope(s) 228 to obtain their data at the time when the visible-light image was taken. Here, the data collection can be synchronized through an atomic clock by using the received satellite signal from GPS 226.

The image recognition module 252 analyzes this visible-light image to identify a region (e.g., group of pixels) in the image representing a device (e.g., region 306 as shown FIG. 3). Once a region representing a device is identified, the image recognition module 252 outputs the region information to the position control module 216. Alternatively, the image recognition module 252 determines a center point of the region and this center point is output to the position control module 216 instead of the region information.

The position control module 216 uses data from the GPS 226 and accelerometer(s) 224 to determine a speed and acceleration of the vehicle 140 (as shown in FIG. 1). In some implementations, the position control module 216 also uses data from the gyroscope(s) 228 to determine an orientation of the vehicle 140 (as shown in FIG. 1). The position control module 216 may use this speed and acceleration information—and, in some implementations, orientation information—in conjunction with the region information provided by the image recognition module 252 to determine an estimated new region where the device will be located.

In some implementations, the position control module 216 takes into account a delay in time when determining an estimated new region due to the time needed for the actuators/motors 214 to reposition the IR camera 110. The position control module 216 then sends instructions to the actuators/motors 214 to change the horizontal and vertical angles of the IR camera 110 so that the IR camera 110's field of view 112 encompasses the estimated new region. An instruction is also sent to the IR camera 110 to obtain an infrared image once it has been repositioned. As with the visible-light image, in some implementations, instructions are also sent to the GPS 226 to obtain position and time data, to the accelerometer(s) 224 to obtain its output data, and/or to the gyroscope(s) 228 to obtain its output data at the time when the infrared image was taken. Here, the data collection can be synchronized through an atomic clock by using the received satellite signal from GPS 226.

The stabilization module 218 is configured to receive the output of one or more gyroscopes of gyroscope(s) 228 as an input, and is configured to provide gyro-stabilization. The input from the one or more gyroscopes is used to detect motion in the IR camera 110 and/or the visible camera 120. Based on these inputs, the stabilization module 218 is further configured to send instructions to one or more of the actuators/motors 214 to counteract the detected motion. In some implementations, the stabilization module 218 also utilizes digital stabilization by using, for example, the measured camera motion from the one or more gyroscopes of gyroscope(s) 228. Here, buffer pixels are implemented that surround effective image pixels. In these implementations, the stabilization module 218 is further configured to adjust the visible-light image taken by the visible camera 120 and/or the infrared image taken by the IR camera 110, and output the modified image(s) to the image recognition module 252. In these implementations, when the one or more gyroscopes of gyroscope(s) 228 detect movement in the IR camera 110 and/or the visible camera 120, the stabilization module 218 moves the area of effective image pixels to account for the detected movement. For example, if one or more gyroscopes of gyroscope(s) 228 detects that the IR camera was bumped up when the infrared image was taken, then the stabilization module 218 may move the effective image pixels downward. Stabilization is particularly important for the IR camera 110 due to its narrower field of view 112. By having a narrow field of view 112, bumps or vibrations the IR camera 110 experiences can result in significant image shifts.

The sensor system 220 is configured to detect information on the vehicle 140 (as shown in FIG. 1), on the IR camera 110, and on the visible camera 120. The sensor system 220 includes a sensor unit 222 that may be housed in the mount 170. The sensor system 220 also includes gyroscope(s) 228, the IR camera 110, and the visible camera 120. The IR camera 110 is a high resolution thermal camera. The visible camera 120 is a high resolution visible-light camera.

The sensor unit 222 is configured to detect information on the vehicle 140 (as shown in FIG. 1), and, in some implementations, information on the IR camera 110 and on the visible camera 120. The sensor unit 222 is further configured to provide time synchronization for data collection by using the received satellite signal from GPS 226, which provides access to an atomic clock. The sensor unit 222 includes accelerometer(s) 224 and GPS 226. Accelerometer(s) 224 can provide a linear acceleration of the vehicle 140 (as shown in FIG. 1). GPS 226 can provide location information of the vehicle 140 (as shown in FIG. 1) and can also provide time information. In some implementations, sensor unit 222 also includes one or more gyroscopes of gyroscope(s) 228.

Specifically, the GPS 226 is configured to detect an estimated location of vehicle 140 (as shown in FIG. 1) with respect to the earth. The GPS 226 is also configured to detect a speed of the vehicle 140 (as shown in FIG. 1). In some implementations, the GPS 226 is configured to detect a direction of travel of the vehicle 140 (as shown in FIG. 1). In some implementations, the GPS 226 is configured to detect an altitude (e.g., elevation) of the imaging system 100. The GPS 226 is further configured to detect time information. This time information can be used for data collection synchronization.

The accelerometer(s) 224 is configured to determine a linear acceleration of the vehicle 140 (as shown in FIG. 1). The gyroscope(s) 228 is configured to determine an orientation of the vehicle 140 (as shown in FIG. 1), and/or determine motion experienced by the IR camera 110 and/or visible camera 120. In some implementations, the accelerometer(s) 224 and one or more gyroscopes of gyroscope(s) 228 are configured to determine an angular rate of the vehicle 140 (as shown in FIG. 1). In some implementations, the accelerometer(s) 224 and one or more gyroscopes of gyroscope(s) 228 are also configured to determine a change in orientation of the vehicle 140 (as shown in FIG. 1). In some implementations, the accelerometer(s) 224 and one or more gyroscopes of gyroscope(s) 228 form an inertial measurement unit (IMU).

Figure 4:
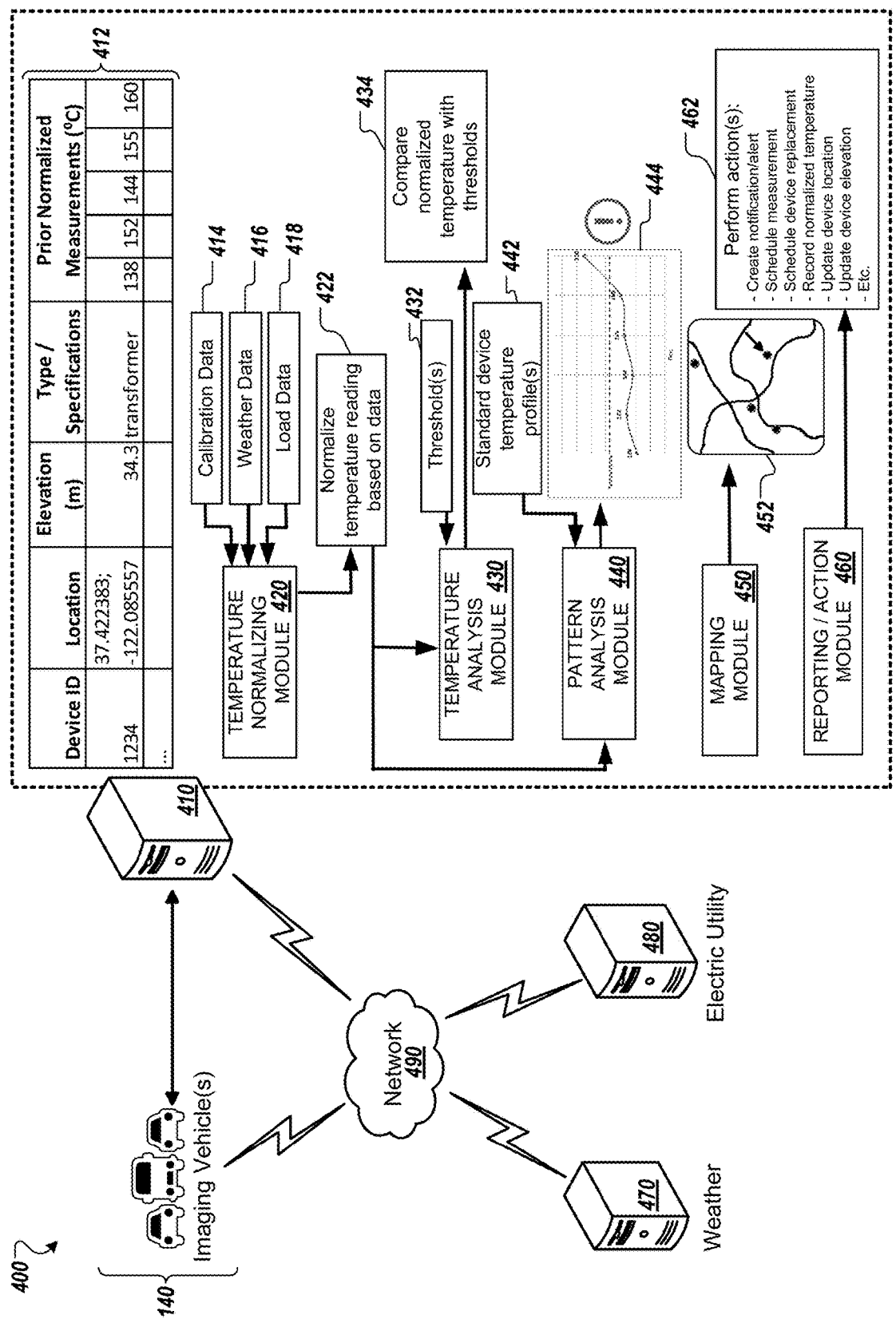
FIG. 4 is a diagram that illustrates an example of a system for processing captured infrared image data.

Communication system 230 is configured to wirelessly couple the imaging system 100 to a centralized computer system (e.g., computing system 410 as shown in FIG. 4). Where the communication system 230 is configured to wirelessly couple the imaging system 100 to a centralized computer system (e.g., computing system 410 as shown in FIG. 4), the communication may take place over a network (e.g., network 490 as shown in FIG. 4). Information exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network (e.g., network 490 as shown in FIG. 4) represents a combination of multiple sub-networks, different network layer protocols are used at each of the underlying sub-networks. In some embodiments, the network (e.g., network 490 as shown in FIG. 4) represents one or more interconnected internetworks, such as the public Internet. In some implementations, the centralized computer system (e.g., computing system 410 as shown in FIG. 4) is embedded in a cloud computing environment. In some implementations, the communication system 230 includes communication interfaces. For example, wireless, WiMAX, Wi-Fi, Bluetooth, satellite, cellular, optical, near field, infrared, or radio interfaces. As shown, communication system 230 includes a receiver 232 and a transmitter 234.

The receiver 232 is configured to receive information from a centralized computer system (e.g., computing system 410 as shown in FIG. 4) and provide such information to computing system 240. In some implementations, the receiver 232 is a laser or radio frequency wave receiver. In some implementations, the receiver 232 receives information about one or more devices such as its device ID, its specific location, its elevation, etc. (see device information 412 as shown in FIG. 4). In these implementations, this device information may be provided to the map processing module 250. In some implementations, the receiver 232 receives this information only for devices that the imaging system 100 is scheduled to monitor. In other implementations, the receiver 232 receives this information for devices that are nearby the vehicle 140 (as shown in FIG. 1) and/or devices that the vehicle 140 will pass on its current route (as may be determined by the map processing module 250). In some implementations, the receiver 232 also receives mapping information (e.g., mapping information 452 as shown in FIG. 4) that indicates where devices are located with respect to navigable roadways. In these implementations, the mapping information may be provided to the map processing module 250.

The transmitter 234 is configured to transmit information from the imaging system 100 to a centralized computer system (e.g., computing system 410 as shown in FIG. 4) in accordance with the computing system 240. In some implementations, the transmitter 1944 is a laser or radio frequency wave transmitter. In some implementations, the transmitter 234 transmits one or more outputs of the sensor system 220 to a centralized computer system (e.g., computing system 410 as shown in FIG. 4), such as the vehicle 140's (as shown in FIG. 1) location from GPS 226. The transmitter 234 transmits the infrared image obtained by the IR camera 110 to a centralized computation system (e.g., computing system 410 as shown in FIG. 4). In some implementations, the transmitter 234 also transmits the visible-light image obtained by the visible camera 120 to a centralized computation system (e.g., computing system 410 as shown in FIG. 4). The transmitter 234 may provide this information through a network (e.g., network 490 as shown in FIG. 4).

The computing system 240 is configured to transmit data to, receive data from, interact with, and/or control one or more of the positioning system 210, sensor system 220, communication system 230, the map processing module 250, the image recognition module 252, and the device identification and location module. In some implementations, the device identification and location module 254 is carried out on a centralized computer system (e.g., computing system 410 as shown in FIG. 4) instead of the computing system 240. In these implementations the centralized computer system (e.g., computing system 410 as shown in FIG. 4) is configured to transmit data to, receive data from, interact with, and/or control the device identification and location module 254 and any other modules that are carried out on the its system (e.g., the temperature normalizing module 420, the temperature analysis module 430, the pattern analysis module 440, the mapping module 450, and/or the reporting/action module 460 as shown in FIG. 4). As shown, computing system 240 includes a processor 242 and data storage 244. The data storage 2444 is configured to store instructions 246.

The map processing module 250 is configured to receive information about one or more devices such as its device ID, its specific location, its elevation, etc. (see device information 412 as shown in FIG. 4). In some implementations, map processing module 250 is further configured to receive mapping information (e.g., mapping information 452 as shown in FIG. 4) that indicates where devices are located with respect to navigable roadways. In some implementations, the information received is only for devices that the imaging system 100 is scheduled to monitor. In other implementations, the information received is for devices that are nearby the vehicle 140 (as shown in FIG. 1) and/or devices that the vehicle 140 will pass on its current route. The map processing module 250 may determine the route that the vehicle 140 (as shown in FIG. 1) is to take based on the location of the devices that the imaging system 100 has been scheduled to monitor. Alternatively, this route is determined by a centralized computer system (e.g., computing system 410 as shown in FIG. 1) and is provided to the map processing module 250.

The map processing module 250 is further configured to receive the output of the GPS 226 as an input. In some implementations, the map processing module 250 is also configured to receive the output of the accelerometer(s) 224 as an input. Based on these inputs, the map processing module 250 may determine a location of the vehicle 140 (as shown in FIG. 1) and a travel direction of the vehicle 140. In other implementations, the travel direction of the vehicle 140 (as shown in FIG. 1) is already known based on a known route of the vehicle 140. Based on the vehicle 140's (as shown in FIG. 1) location, its direction of travel, and the locations of the devices to be monitored, the map processing module 250 determines which device of the devices to be monitored (e.g., utility equipment 130) the imaging system 100 will encounter first. The map processing module 250 will determine the device ID (e.g., Device ID 1234 of utility equipment 130) of the upcoming device and obtain its associated information, such as its elevation.

The information associated with the upcoming device may be output to the position control module 216. In some implementations, information associated with the upcoming device may also be output to the device identification and location module 254. In some implementations, the map processing module 250 determines a speed of the vehicle 140 (as shown in FIG. 1) through use of the GPS 226. This speed may be output to the position control module 216. In some implementations, the map processing module 250 determines a linear acceleration of the vehicle 140 (as shown in FIG. 1) through use of the accelerometer(s) 224. This linear acceleration may be output to the position control module 216.

In some implementations, the map processing module 250 is carried out on the imaging system 100 by the computing system 240. In other implementations the map processing module 250 is carried out on a centralized computer system (e.g., computing system 410 as shown in FIG. 4) that communicates with the imaging system 100 through the communication system 230. In those implementations, the map processing module 250 may be the same as mapping module 450 (as shown in FIG. 4).

The image recognition module 252 is configured to receive a visible-light image from visible camera 120 and identify a region (e.g., pixels) in the image representing a device. Once a region representing a device (e.g., region 306 as shown in FIG. 3) is identified, the image recognition module 252 outputs the region information to the position control module 216. Alternatively, the image recognition module 252 determines a center point of the region and this center point is output to the position control module 216 instead of the region information. In some implementations, the region representing a device is output to the device identification and location module 254. This task of identifying a region in the visible-light image that is a device is ideally carried out on the imaging system 100 by computing system 240 due to time constraints.

In some implementations, the image recognition module 252 is further configured to receive an infrared image from the IR camera 120 and identify a region (e.g., pixels) in the image representing a device. In these implementations, once a region representing a device (e.g., region 314 as shown in FIG. 3) is identified, the image recognition module 252 outputs the region information to a centralized computer system (e.g., computing system 410) through the communication system 230. In these implementations, the task of identifying a region in the infrared image that is a device is carried out on imaging system 100 by computing system 240. In other implementations, the task of identifying a region in the infrared image that is a device may be carried out on a centralized computer system (e.g., computing system 410 as shown in FIG. 4) after receiving the infrared image by another image recognition module.

The image recognition module 252 (and potentially other image recognition modules of a remote computer system) may use machine learning algorithms in order to recognize devices in the visible-light image and/or the infrared image. Machine learning algorithms may include, for example, a Bayesian model, a neural network algorithm, and/or a support vector algorithm.

The device identification and location module 254 is configured to confirm and/or determine information regarding a device. The device identification and location module 254 is configured to receive the output of the GPS 226 and one or more gyroscopes of gyroscope(s) 228 as input. Once a region representing a device (e.g., region 306 as shown in FIG. 3) in the visible-light image is identified by the image recognition module 252, the device identification and location module 254 confirms the device ID (e.g., Device ID 1234 of utility equipment 130) of the device by comparing the location data obtained from GPS 226 when the visible-light image was taken with the location information of the devices to be monitored. Once the device ID of the device is confirmed, the device identification and location module 254 may obtain additional information about the identified device (e.g., device information 412 as shown in FIG. 4). This information may include the location of the device, its elevation, the type of device, and, in some implementations, its dimensions.

The device identification and location module 254 may update location and elevation data of the identified device. In order to determine the location of the identified device, the device identification and location module 254 first determines a viewing angle of the device with respect to the imaging system 100 and the horizon by using the vertical angle of the visible camera 120 when the visible-light image was taken (obtained from position control module 216), the orientation of the vehicle 140 (as shown in FIG. 1) when the visible-light image was taken determined from one or more gyroscopes of gyroscope(s) 228 and/or accelerometer(s) 224, and the location of the identified region representing a device within the visible-light image. The device identification module 254 may then compare the size of the identified region representing the device with the dimensions of the device (taking into account the perspective created by angle of the device) in order to determine an absolute distance of the identified device from the imaging system 100 (specifically from visible camera 120).

In some implementations, the imaging system 100 has a Lidar unit which can measure the distance of the identified device from the imaging system 100, thus removing the need for the size comparison. In some implementations, the device identification and location module 254 can determine the absolute distance of the identified device from the imaging system 100 by taking into account the pixel size of the image sensor of the visible camera 120 and the focal length of the lens of the visible camera 120, thus removing the need for the size comparison. Having the angle of the identified device and an absolute distance of the device from the imaging system 100, the device identification and location module 254 determines a horizontal component of the distance. The device identification and location module 254 can then determine a direction of the identified device with respect to the imaging system 100 by using the horizontal angle of the visible camera 120 when the visible-light image was taken (obtained from position control module 216), the orientation of the vehicle 140 (as shown in FIG. 1) when the visible-light image was taken determined from one or more gyroscopes of gyroscope(s) 228 and/or accelerometer(s) 224, and the location of the identified region representing a device within the visible-light image. Having the location of the imaging system 100 (e.g., location of the vehicle 140) when the visible-light image was taken, the horizontal distance of the identified device from the imaging system, and the direction of the identified device, the device identification and location module 254 can determine a location of the identified device. Similarly, having already determined an angle of the identified device and the absolute distance of the identified device from the imaging system 100, the device identification and location module 254 can determine the vertical component of the distance (e.g., the height of the identified device). This vertical component can serve as the elevation of the device or be used to calculate the elevation of the device.

In some implementations, elevation can be calculated by combining the determined vertical component with the known elevation of the imaging system 100 determined from GPS 226. In other implementations, elevation can be calculated by combining the determined vertical component with the known height of the imaging system 100 off the ground. In other implementations, the imaging system 100 further analyzes the obtained visible-light image to determine a height of the device with respect to the ground underneath the device. In these implementations, the determined height would serve as the elevation of the device.

If the determined location of the identified device differs from its stored location, the device identification and location module 254 will output the updated location information. If the determined elevation of the identified device differs from its stored elevation, the device identification and location module 254 will output the updated elevation information. In some implementations, this updated information is output to a centralized computer system (e.g., computing system 410 as shown in FIG. 4) through communication system 230 to update the stored elevation information associated with the identified device. In other implementations, the device identification and location module 254 is carried out on a centralized computer system (e.g., computing system 410 as shown in FIG. 4) and this updated information is output to the reporting/action module 460 (as shown in FIG. 4). The device identification and location module 254 can also output the determined viewing angle of the identified device, the determined direction of the identified device, and the determined absolute distance of the identified device with respect to the imaging system 100.

In some implementations, the device identification and location module 254 carries out the task of determining the location and elevation of an identified device by using the obtained infrared image in addition to or instead of using the obtained visible-light image. This analysis on the infrared image can be used for structure from motion (SFM) type algorithms to improve the determined viewing angle of the identified device, the determined direction of the identified device, the determined absolute distance of the identified device with respect to the imaging system 100, the determined location of the identified device, and the determined elevation of the identified device. Using the infrared image is beneficial in areas where imagery in visible light does not show sufficient number of features. For example, a transformer can sometimes appear brown in a visible-light image and blend in with the utility pole on which it is mounted. However, in infrared wavelengths, the transformer stands out from the background and offers more features for SFM computation resulting in more accurate calculation of the viewing angle of the identified device, the direction of the identified device, the absolute distance of the identified device with respect to the imaging system 100, the location of the identified device, and the elevation of the identified device.

In some implementations, the device identification and location module 254 is carried out on the imaging system 100 by the computing system 240. In other implementations the device identification and location module 254 is carried out on a centralized computer system (e.g., computing system 410 as shown in FIG. 4) that communicates with the imaging system 100 through the communication system 230.

The longpass filter 256 is an optical filter fitted to the IR camera 110 and configured to reduce the noise level of the obtained infrared image. The longpass filter 256 attenuates shorter wavelengths and transmits longer wavelengths over the infrared spectrum.

FIG. 3 is a diagram that illustrates examples of representations of image data captured by the visible camera 120 and the IR camera 110. On the left is an obtained visible-light image 302. On the right is an obtained infrared image 312.

As is shown on the left, after the visible-light image has been processed by the image recognition module 252 (as shown in FIG. 2), a region 306 representing the device is identified. As shown, a centered area 308 represents the initial location of the IR camera 110's field of view. Once the region 306 representing the device is identified, the position control module 216 (as shown in FIG. 2) instructs that the IR camera 110 should be repositioned so that the identified device falls within its field of view. The area 304 represents the new location of the IR camera 110's field of view, now encompassing the identified device. It is important to note that IR camera 110 would be repositioned in such a way as to take into account the speed of the vehicle and other factors as discussed above. As such, it is not always the case that the IR camera 110 would be repositioned to encompass the identified region. Once the IR camera 110 has been repositioned, an infrared image 312 is obtained.

As is shown on the right, after the infrared image 312 has been processed by, for example, the image recognition module 252 (as shown in FIG. 2), a region 314 representing the device is identified. After the infrared image 312 is transmitted to a centralized computer system (e.g., computing system 410 as shown in FIG. 4), the infrared image 312 is analyzed to determine if any anomalies are detected. In the infrared image darker colors are associated with colder temperatures and lighter colors are associated with hotter temperatures. Anomalies can include hotspots. Here, three hotspots 310 have been detected.

FIG. 4 is a diagram that illustrates an example system 400 for processing captured infrared image data. The system 400 includes imaging vehicle(s) 140, computing system 410, weather server 470, electric utility server 480, and network 490. The computing system 410 may communicate with one or more imaging vehicle(s) 140 through network 490. The computing system 410 also includes a temperature normalizing module 420, a temperature analysis module 430, a pattern analysis module 440, a mapping module 450, and a reporting/action module 460. Each imaging vehicle of imaging vehicle(s) 140 has its own imaging system 100 (as shown in FIG. 2).

Information exchanged over the network 490, is transferred using any number of network layer protocols, such as Internet Protocol (IP), Multiprotocol Label Switching (MPLS), Asynchronous Transfer Mode (ATM), Frame Relay, etc. Furthermore, in embodiments where the network 490 represents a combination of multiple sub-networks, different network layer protocols are used at each of the underlying sub-networks. In some embodiments, the network 490 represents one or more interconnected internetworks, such as the public Internet. In some implementations, the computing system 410 is embedded in a cloud computing environment. In some implementations, computing system 410 is also in communication with the weather server 470 and/or the electric utility server 480. Through the network 490, the computing system 410 can obtain weather data 416 from the weather server 470. Through the network 490, the computing system 410 can obtain load data on a particular device at a given date and time from the electric utility server 480.

The computing system 410 stores device information 412. Device information 412 may include a device ID, a location, an elevation, a type/specification, and prior normalized measurements. Device information 412 may also include the age and/or the dimensions of the related device. Device ID may be a number, or a string consisting of letters and/or numbers. Location may be GPS coordinates (e.g., latitude and longitude coordinates). Elevation or altitude may be the height (here in meters) of the device with respect to the roadway on which the vehicle(s) 140 is traveling on when an image of the device is taken, with respect to the ground underneath the device, with respect to the imaging system 100, or with respect to sea level (as may be determined, in part, by GPS 226). Type/specification indicates the type of utility equipment or wire that the device is. For example, device 1234 is a transformer type. Other types/specifications may include, for example, insulator bushing, capacitor, voltage regulator, transmission conductor, etc.

The computing system 410 analyzes the obtained infrared image and determines one or more normalized temperature measurements of the device for that particular date and time. The normalized temperature measurements are associated with a date and time at which the related infrared image was obtained. The computing system 410 can receive this time information from imaging system 100 (as shown in FIGS. 1-2), which can utilize an atomic clock through GPS 226 (as shown in FIG. 2).

In some implementations, the computing system 410 stores some or all prior normalized temperature measurements of the associated device. In other implementations, the computing system 410 stores only a subset of the most recent normalized temperature measurements (e.g., the five most recent measurements). In some implementations, only the highest normalized temperature measurement of the device for a given date and time is stored (as shown). In other implementations, a number of normalized temperature measurements for a given date and time are stored. In these implementations, each normalized temperature measurement stored for a given date and time may represent a discovered anomaly in the obtained infrared image. For example, looking at the infrared image 312 of FIG. 3, the computing system 410 may store three normalized temperature measurements, one for each of the hotspots 310, and associate those measurements with the date and time at which infrared image 312 was taken. The computing system 410 may store the infrared image of a device obtained on a given time and date. The computing system 410 may also store a normalized temperature profile of the device for a given time and date when the related infrared image was obtained.

Other information may be stored on computing system 410 in association with a particular device for a particular date and time. This information may include, for example, a viewing angle of the particular device, the direction of the particular device with respect to the imaging system 100 (as shown in FIGS. 1-2), and/or a distance of the particular device from the imaging system 100 for a given imaging date and time.

The temperature normalizing module 420 is configured to receive all or a portion of the obtained infrared image, calibration data 414, weather data 416, and load data 418 as inputs. In some implementations, the temperature normalizing module 420 only receives the region (e.g., pixels) of the obtained infrared image representing the device (e.g., region 314 as shown in FIG. 3) after the obtained infrared image has been processed by an image recognition module (e.g., image recognition module 252 as shown in FIG. 2). In other implementations, the temperature normalizing module 420 receives the entire obtained infrared image, but only processes the region (e.g., pixels) of the obtained image representing the device (e.g., region 314 as shown in FIG. 3) as indicated by an image recognition module (e.g., image recognition module 252 as shown in FIG. 2).

Calibration data 414 allows the computing system 410 to determine a temperature of the obtained infrared image data (e.g., pixels) for a given type/model of infrared camera (e.g., IR camera 110 as shown in FIGS. 1-2). Where more than one type/model of infrared camera is used by the imaging vehicle(s) 140, calibration data 414 may be provided to the computing system 410 by the respective imaging system 100 (as shown in FIGS. 1-2) that obtained the infrared image. Where imaging vehicle(s) 140 use the same type/model of infrared camera, calibration data 414 may already be stored on computing system 410.

Weather data 416 may include the air temperature (e.g., ambient temperature), the wind speed, the sky cover (e.g., cloudy, mostly cloudy, partly cloudy, mostly sunny, sunny, etc.)/solar radiation, and/or the precipitation (e.g., rain, hail, snow, etc.) of the geographical area in which the particular device is located for a given date and time when the infrared image was obtained.

Load data 418 is the electrical load on the particular device for a given date and time when the infrared image was obtained. In some implementations, load data 418 is the estimated electrical load on the particular device for a given date and time when the infrared image was obtained. In some implementations, load data 418 is a range of possible electrical load on the particular device for a given date and time when the infrared image was obtained.

In some implementations, the temperature normalizing module 420 also takes into account other information. This other information may include, for example, the time of day at which the image was taken (which may be used to indicate the angle of the sun and, thus, solar radiation), whether the device was in shade, partially shaded, or not shaded, and/or mechanical losses experienced by the device at the date and time when the image was taken.

The temperature normalizing module 420 is further configured to determine a normalized temperature reading of the device. The temperature normalizing module 420 first uses calibration data 414 to determine temperatures in the region of the infrared image representing the device (e.g., region 314 as shown in FIG. 3). This can include determining a temperature profile or reading for the device that shows different temperatures for different parts of the device for the given date and time when the infrared image was obtained. The temperature normalizing module 420 then uses the weather data 416 and load data 418 to normalize the temperature profile of the device (step 422). The temperature profile of the device can be normalized with respect to the weather data 416 to remove the influence of precipitation, wind, sunlight, or a colder or warmer ambient temperature relative to a baseline temperature. Similarly, the temperature profile of the device can be normalized with respect to the load data 418 to remove the influence of different load conditions on the device between measurements. For example, a measurement taken during a period of high load may show a higher temperature, not because of a malfunction, but simply due to the load status. Normalizing based on load can allow the measurements to be more comparable and thus increase the accuracy of status estimates and anomaly detection.

The temperature normalizing module 420 is further configured to provide the normalized temperature reading of the device to the temperature analysis module 430. In some implementations, the temperature normalize module is further configured to provide the normalized temperature reading of the device to the pattern analysis module 440.

The temperature analysis module 430 compares the normalized temperature profile of the device with temperature threshold(s) 432 (step 434). Temperature threshold(s) 432 can be based on the type/specification of the particular device. In some implementations, temperature threshold(s) 432 are also based on the age of the device. If measured normalized temperature measurements of the device's temperature profile exceed the one or more thresholds of threshold(s) 432 an anomaly is detected. Temperature analysis module 430 may then output detected anomalies to the reporting/action module 460. A detection of temperatures exceeding these one or more thresholds can indicate a resistance breakdown in the device which may lead to accelerated aging of the device or device failure.

In some implementations, threshold(s) 432 includes multiple temperature thresholds, each associated with a different level of seriousness and/or associated with a different action to be performed if exceeded. For example, if a first, low threshold of threshold(s) 432 is exceeded and output to the reporting/action module 460 by the temperature analysis module 430, the reporting/action module 460 may only create a notification/alert that an anomaly was detected. This first, low threshold may correspond with a temperature that is higher than expected for the type of device imaged but still within normal range. If a second, medium threshold of threshold(s) 432 is exceeded and output to the reporting/action module 460 by the temperature analysis module 430, the reporting/action module 460 may create a notification/alert that an anomaly was detected and may schedule a new measurement of the device and/or reschedule the next measurement of the device so that it is to occur sooner. This second, medium threshold may correspond with a temperature that is higher than normal for the type of device imaged. If a third, high threshold of threshold(s) 432 is exceeded and output to the reporting/action module 460 by the temperature analysis module 430, the reporting/action module 460 may create a notification/alert that an anomaly was detected and may schedule the replacement of the device. This third, high threshold may correspond with a temperature that is higher than allowable stress design for the type of device imaged.

Similarly, in some implementations, an anomaly may be created if measured normalized temperature measurements of the device's temperature profile falls below one or more other thresholds of threshold(s) 432. A detection of temperatures falling below these one or more thresholds can indicate a structural change in the device and, thus, impending problems. In some implementations, the temperature analysis module 430 is configured to indicate the portions of the device's temperature profile that exceed (or fall below) the threshold(s) 432 to the pattern analysis module 440.

The pattern analysis module 440 is configured to compare the all, a portion, or a part of the device's temperature profile over time with a standard device temperature profile(s) 442. The standard device temperature profile(s) 442 can be based on the type/specification of the particular device. The standard device temperature profile(s) 442 can be based on the age of the particular device. In some implementations, the pattern analysis module 440 compares the device's entire temperature profile for each date and time when an infrared image of the device was obtained with the standard device temperature profile(s) 442 for that same range of time. In some implementations, the pattern analysis module 440 compares only a portion of the device's temperature profile that resulted in an anomaly for each date and time when an infrared image of the device was obtained with a similar portion of the standard device temperature profile(s) 442 for that same range of time. In some implementations and as shown, the pattern analysis module 440 compares only the device's highest, measured normalized temperature for each date and time when an infrared image of the device was obtained with highest temperature of the standard device temperature profile(s) 442 for that same range of time.

If the comparison results in anomalies being detected, the pattern analysis module 440 may then output the detected anomalies to the reporting/action module 460. An example comparison 444 is shown that has resulted in a detected anomaly. An anomaly may be detected by the pattern analysis module 440 when all of or a portion of the device's temperature profile regularly exceeds that of the standard device temperature profile(s) 442 (e.g., over multiple measurements taken at different times, such as on different days). As another example, an anomaly may be detected if a single measurement indicates that all or a portion of the device's temperature profile is exceed that of the standard device temperature profile(s) 442. As another example, an anomaly may be detected when all of or a portion of the device's temperature profile shows a pattern of increasing deviation from the standard device temperature profile(s) 442 over time.

Sometimes a device's temperature profile may exceed the standard device temperature profile(s) 442 for a given time or date but not to such an extent as to exceed threshold(s) 432. However, even without threshold(s) 432 being exceeded, the pattern analysis module 440 may still determine that an anomaly is detected. Depending on the severity of the deviation of all, a portion, or a part of the device's temperature profile over time from that of the standard device temperature profile(s) 442, the reporting/action module 460 may perform different actions. For example, if an anomaly for a slight deviation is detected and output by the pattern analysis module 440, the reporting/action module 460 may only create a notification/alert that an anomaly was detected. If an anomaly for a moderate deviation is detected and output by the pattern analysis module 440, the reporting/action module 460 may create a notification/alert that an anomaly was detected and may schedule a new measurement of the device and/or reschedule the next measurement of the device so that it is to occur sooner. If an anomaly for a significant deviation is detected and output by the pattern analysis module 440, the reporting/action module 460 may create a notification/alert that an anomaly was detected and may schedule the replacement of the device.

The mapping module 450 is configured to map the locations of the devices on a road map. An example map 452 is shown with the devices appearing as circles. In the example map 452, an arrow is pointing to the current device being analyzed (utility equipment 1234). In some implementations, the mapping module 450 receives a schedule of devices that are to be imaged (e.g., measured). Based on the received schedule, the mapping module 450 may determine a route for one or more vehicles of imaging vehicle(s) 140 to take and which devices the one or more vehicles of imaging vehicle(s) 140 should image.

Reporting/action module 460 is configured to perform one or more actions based on information received by the computing system 410. Based on the computing system 410 receiving device location and elevation information from imaging system 100 (as shown in FIGS. 1-2), the reporting/action module 460 may update the stored device location and elevation information of device information 412. Based on the determined normalized temperature profile of the device (step 422), the reporting/action module 460 may record all, a portion, or a part of the device's normalized temperature profile and, thus, update the stored prior normalized temperature measurements of device information 412. Based on an anomaly being detected, the reporting/action module 460 may create a notification/alert, may schedule a new measurement of the device, may reschedule a measurement of the device so that the measurement is now scheduled sooner, and/or may schedule device replacement (and cancel scheduled measurements of the device).

Analyzing only a part of a device's normalized temperature profile (e.g., its high temperature) has the benefit of reducing the amount of processing power when compared with analyzing all or a portion of a devices normalized temperature profile. A single measurement of the device's high temperature can be useful to determine whether the device is operating at a temperature higher than expected but still within normal range, higher than normal, or higher than allowable stress design. These determinations can be used by computing system 410 to determine whether the device is aging at an accelerated rate, or if it is possibly close to failure. Similarly, a single measurement of the device's low temperature can be useful to determine if the device is operating at a temperature lower than expected but still within normal range, or lower than normal. These determinations can be used by computations system 410 to determine whether a structural change in the device has occurred that may lead to later problems.

In some implementations, the computing system 410 can estimate the health of a device without having to create a normalized temperature profile of the device. In these implementations, the computing system 410 converts the obtained infrared image of the device to a temperature profile with the calibration date (e.g., calibration data 414) and then receives all, a portion, or a part of the temperature profiles from neighboring devices. If all, a portion, or a part of the temperature profile of the device deviates significantly from the neighboring devices, the computing system 410 determines that an anomaly has occurred. In these implementations, ambient temperature and many other weather conditions should be similar between the device and neighboring devices due to their close proximity. In these implementations, similar loads on all the devices are assumed. This type of anomaly detection would have the benefit of reducing the amount of processing power needed.

A module (also known as a program, software, software application, script, or code) may be written in any form of programming language, including compiled or interpreted languages, and it may be deployed in any form, including as a stand-alone program or as a module, component, subroutine, or other unit suitable for use in a computing environment. A module does not necessarily correspond to a file in a file system. A module may be stored in a portion of a file that holds other programs or data (e.g., one or more scripts stored in a markup language document), in a single file dedicated to the program in question, or in multiple coordinated files (e.g., files that store one or more modules, sub programs, or portions of code). A module may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a module include, by way of example, both general and special purpose microprocessors, and one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the invention have been described. Other embodiments are within the scope of the following claims. For example, the actions recited in the claims may be performed in a different order and still achieve desirable results.

What is claimed is:

1. A method comprising:
   operating a camera system coupled to a vehicle, the camera system comprising a visible-light camera and an infrared camera;
   while the vehicle is moving, tracking a position of a device with respect to the camera system based at least in part on image data captured using the visible-light camera;
   repeatedly adjusting a position of the infrared camera based on the tracked position of the device to maintain the device in a field of view of the infrared camera as the vehicle with the camera system moves with respect to the device;
   recording image data generated by the infrared camera that indicates properties of the device;
   determining a temperature of the device based on the image data generated by the infrared camera; and
   determining a level of wear of the device based on the determined temperature.

2. The method of claim 1, further comprising determining an identifier for the device; and
   wherein recording the image data from the infrared camera comprises associating the recorded image data with the identifier for the device.

3. The method of claim 1, wherein the visible-light camera has a first field of view; and
   wherein the infrared camera has a second field of view that is narrower than the first field of view of the visible-light camera.

4. The method of claim 3, wherein the first field of view of the visible-light camera is in a range of 120-180 degrees diagonal; and
   wherein the second field of view of the infrared camera is in a range of 6-24 degrees diagonal.

5. The method of claim 1, further comprising:
obtaining location data and a travel direction of the vehicle from one or more sensors coupled to the vehicle, wherein the visible-light camera and the infrared camera are mounted to the vehicle;
accessing map data indicating locations of devices to be monitored;
selecting one of the devices to be monitored based on the map data, the location data, and the travel direction of the vehicle; and
positioning the visible-light camera toward an anticipated location of the selected device that is determined using the map data.

6. The method of claim 1, wherein the visible-light camera and the infrared camera are stabilized by a stabilization module that uses one or more sensors and one or more motors or actuators to compensate for movement of the vehicle.

7. The method of claim 1, wherein determining the temperature of the device comprises determining a normalized temperature of the device, including:
receiving data indicating ambient conditions for the device; and
calculating the normalized temperature of the device based on the ambient conditions.

8. The method of claim 1, wherein determining the temperature of the device comprises determining a normalized temperature of the device, including:
receiving load data indicating an electrical load for the device; and
calculating the normalized temperature of the device based on the load data to adjust for changes in temperature caused by load conditions at a time the image data was generated by the infrared camera.

9. The method of claim 1, wherein determining the level of wear of the device comprises:
comparing the temperature of the device with one or more predetermined temperature thresholds; and
determining if the temperature of the device exceeds the one or more predetermined temperature thresholds.

10. A system comprising:
one or more computers; and
one or more computer-readable media storing instructions that are operable, when executed by the one or more computers, to cause the one or more computers to perform operations comprising:
operating a camera system coupled to a vehicle, the camera system comprising a visible-light camera and an infrared camera;
while the vehicle is moving, tracking a position of a device with respect to the camera system based at least in part on image data captured using the visible-light camera;
repeatedly adjusting a position of the infrared camera based on the tracked position of the device to maintain the device in a field of view of the infrared camera as the vehicle with the camera system moves with respect to the device;
recording image data generated by the infrared camera that indicates properties of the device;
determining a temperature of the device based on the image data generated by the infrared camera; and
determining a level of wear of the device based on the determined temperature.

11. The system of claim 10, wherein the operations comprise determining an identifier for the device; and
wherein recording the image data from the infrared camera comprises associating the recorded image data with the identifier for the device.

12. The system of claim 10, wherein the visible-light camera has a first field of view; and
wherein the infrared camera has a second field of view that is narrower than the first field of view of the visible-light camera.

13. The system of claim 12, wherein the first field of view of the visible-light camera is in a range of 120-180 degrees diagonal; and
wherein the second field of view of the infrared camera is in a range of 6-24 degrees diagonal.

14. The system of claim 10, wherein the operations comprise:
obtaining location data and a travel direction of the vehicle from one or more sensors coupled to the vehicle, wherein the visible-light camera and the infrared camera are mounted to the vehicle;
accessing map data indicating locations of devices to be monitored;
selecting one of the devices to be monitored based on the map data, the location data, and the travel direction of the vehicle; and
positioning the visible-light camera toward an anticipated location of the selected device that is determined using the map data.

15. The system of claim 10, wherein the visible-light camera and the infrared camera are stabilized by a stabilization module that uses one or more sensors and one or more motors or actuators to compensate for movement of the vehicle.

16. The system of claim 10, wherein determining the temperature of the device comprises determining a normalized temperature of the device, including:
receiving data indicating ambient conditions for the device; and
calculating the normalized temperature of the device based on the ambient conditions.

17. The system of claim 10, wherein determining the temperature of the device comprises determining a normalized temperature of the device, including:
receiving load data indicating an electrical load for the device; and
calculating the normalized temperature of the device based on the load data to adjust for changes in temperature caused by load conditions at a time the image data was generated by the infrared camera.

18. The system of claim 10, wherein determining the level of wear of the device comprises:
comparing the temperature of the device with one or more predetermined temperature thresholds; and
determining if the temperature of the device exceeds the one or more predetermined temperature thresholds.

19. One or more non-transitory computer-readable media storing instructions that are operable, when executed by one or more processors, to cause the one or more processors to perform operations comprising:
operating a camera system coupled to a vehicle, the camera system comprising a visible-light camera and an infrared camera;
while the vehicle is moving, tracking a position of a device with respect to the camera system based at least in part on image data captured using the visible-light camera;
repeatedly adjusting a position of the infrared camera based on the tracked position of the device to maintain the device in a field of view of the infrared camera as the vehicle with the camera system moves with respect to the device;

recording image data generated by the infrared camera that indicates properties of the device;

determining a temperature of the device based on the image data generated by the infrared camera; and determining a level of wear of the device based on the determined temperature.

20. The one or more non-transitory computer-readable media of claim 19, wherein the operations comprise determining an identifier for the device; and wherein recording the image data from the infrared camera comprises associating the recorded image data with the identifier for the device.

* * * * *